United States Patent [19]

Wu

[11] Patent Number: 5,571,953
[45] Date of Patent: Nov. 5, 1996

[54] METHOD AND APPARATUS FOR THE LINEAR REAL TIME ESTIMATION OF AN AIRCRAFT CENTER OF GRAVITY

[75] Inventor: Tzong-Hsiu B. Wu, Redmond, Wash.

[73] Assignee: The Boeing Company, Seattle, Wash.

[21] Appl. No.: 441,589

[22] Filed: May 15, 1995

[51] Int. Cl.$^6$ ................................................. G01M 1/12
[52] U.S. Cl. ........................................ 73/65.06; 364/463
[58] Field of Search ............................. 73/65.06, 65.05, 73/65.01, 178 T; 364/463, 428, 434, 435, 439; 340/945

[56] References Cited

U.S. PATENT DOCUMENTS

| | | | |
|---|---|---|---|
| 4,110,605 | 8/1978 | Miller | 73/65.06 |
| 4,937,754 | 6/1990 | Buisson | 73/65.06 |
| 5,034,896 | 7/1991 | Orgun et al. | 364/463 |

Primary Examiner—Christine K. Oda
Attorney, Agent, or Firm—Christensen O'Connor Johnson & Kindness PLLC

[57] ABSTRACT

A method and apparatus for the real time estimation of the location of the center of gravity in an aircraft using a linear estimation technique. The center of gravity estimate is used in the aircraft's flight control system (12) to implement flight control laws that depend on the aircraft's center of gravity. The center of gravity is initially estimated based on signals indicative of the aircraft angle of attack, flap setting, elevator position, and stabilizer position. The initial approximation is then refined by multiplying or dividing the center of gravity estimate by additional factors including the weight of the aircraft, the expected load factor on the aircraft, the dynamic pressure on the aircraft, and the reference wing area of the aircraft. The resulting center of gravity estimate is measured as a percentage of the mean aerodynamic chord (MAC) of the aircraft.

24 Claims, 5 Drawing Sheets

METHOD AND APPARATUS FOR THE LINEAR REAL TIME ESTIMATION OF AN AIRCRAFT CENTER OF GRAVITY

FIELD OF THE INVENTION

The present invention relates generally to aircraft flight control and navigation systems, and more specifically, to a method and apparatus for linearly estimating an aircraft center of gravity.

BACKGROUND OF THE INVENTION

There are numerous situations in which the location of an aircraft's center of gravity has an effect on the manner in which the aircraft control surfaces are operated to maneuver the aircraft. One situation in which locating the aircraft's center of gravity is important is during the final stages of an automatic landing procedure. When a large aircraft nears the ground, the aircraft experiences substantial lift and pitching moment changes. To compensate for these moment changes, open loop ground effect compensation is typically incorporated in modern autoland systems. The ground effect compensation causes the aircraft to execute a flare-like maneuver prior to touchdown of the aircraft. The amount of compensation provided to the elevators of an aircraft in order to execute the flare maneuver primarily depends on the aircraft approach speed, the flap setting being used during the landing procedure, and the location of the aircraft's center of gravity. Accurately estimating an aircraft's center of gravity during flight therefore improves the overall touchdown capability of the aircraft. It will also be recognized that there are numerous other situations in which an aircraft center of gravity estimate is a useful input to the flight control system in order to implement various flight control laws. To generally improve the handling of aircraft, it is therefore very beneficial to be able to provide a real time estimate of an aircraft center of gravity.

Historically, it was impossible to provide a real time measurement of an aircraft's center of gravity using onboard equipment. In practice, it had therefore been accepted to use a worst case estimate of the center of gravity in automatic flight control situations in which the center of gravity was an important parameter. Although the practice of using a worst case estimate provided generally satisfactory results, improved performance could be achieved if the center of gravity could be accurately estimated during flight.

A technique for providing a real time estimate of an aircraft's center of gravity was first disclosed in U.S. Pat. No. 5,034,896, entitled "Method and Apparatus for Real Time Estimation of Aircraft Center of Gravity" (expressly incorporated herein by reference). The '896 patent disclosed a graphical technique to estimate the center of gravity of an aircraft based on an aircraft's angle of attack, flap setting, and stabilizer position. In the estimation technique, a CG estimator estimates the center of gravity from the equation $A_1 S + A_2$, where S is equal to the stabilizer position of the aircraft, and $A_1$ and $A_2$ are dependent upon the aircraft flap setting and the aircraft angle of attack at the time that the center of gravity estimate is being provided. The variable $A_1$ is generated by a slope generator which determines the slope from a slope relationship graph. The slope is based on the aircraft angle of attack and aircraft flap setting. The variable $A_2$ is generated by an intercept generator, which also receives the aircraft's angle of attack and flap setting and determines the intercept value from an intercept relationship graph. A summer adds the results from the intercept generator with the results from the slope generator multiplied by the stabilizer position in order to arrive at a center of gravity estimate. The center of gravity estimate is used by an elevator controller to generate an appropriate elevator compensation signal.

While the center of gravity estimator disclosed in the '896 patent was an improvement over the method of using the worst case estimate of the center of gravity, several shortcomings existed in the method. Measurements made during landing simulations indicate that a graph of the airplane stabilizer position versus the angle of attack for a given center of gravity should exhibit a weak convex nonlinearity. When plotting stabilizer position versus angle of attack for a given center of gravity estimated using the method of the '896 patent, however, the graph exhibits a weak concave nonlinearivy, especially for an angle of attack within a range of 3° to 6°. Consequently, within the mid-range angle of attack, the center of gravity estimator of the '896 patent produces an error of as much as 4% of the mean aerodynamic chord (MAC) in comparison with the actual location of the airplane's center of gravity. Moreover, the method and apparatus disclosed in the '896 patent is rather cumbersome and difficult to implement in flight control system. Because the method relies on graphical techniques to determine an aircraft's center of gravity, the method is difficult to implement with limited computing resources. It would therefore be an improvement over those techniques known in the art to generate a real time estimate of an aircraft's center of gravity that is highly accurate and easier to implement in the flight control system.

SUMMARY OF THE INVENTION

The present invention provides an improved method and apparatus for estimating the position of an aircraft's center of gravity while the aircraft is in flight, and for executing a maneuver procedure that at least in part depends upon the aircraft's center of gravity. Initially, the following three signals are added to arrive at a center of gravity approximation for the aircraft: (1) a signal representing a constant $K_1$; (2) a signal indicative of the aircraft angle of attack that is multiplied by a constant $K_2$; and (3) a signal indicative of an adjusted stabilizer position that is multiplied by a constant $K_3$. After approximating the center of gravity based on the stabilizer position and the angle of attack, several additional factors are multiplied or divided into the approximation to arrive at a center of gravity estimate. The additional factors include the weight of the aircraft, the expected load factor on the aircraft, the dynamic pressure on the aircraft, and the reference wing area of the aircraft. The resulting signal provides a real time estimate of the aircraft center of gravity as the aircraft is landing. In a preferred embodiment of the invention, the center of gravity is measured as a percentage of the mean aerodynamic chord (MAC).

In accordance with one aspect of the invention, the constants used to estimate the center of gravity depend on the flap setting of the aircraft. During landing, the aircraft flaps will typically be set at either 20 or 30. When the flap setting is 20, a first set of values for constants $K_1$, $K_2$, and $K_3$ is selected. When the flap setting is 30, a second set of values for constants $K_1$, $K_2$, and $K_3$ is selected. The method disclosed herein therefore adapts the center of gravity calculation based on the control surface settings of the aircraft during landing.

In accordance with another aspect of the invention, the center of gravity estimate is input to a limiter. The limiter bounds the values that the center of gravity estimate can assume to a minimum and maximum value, preventing erroneous estimates of the center of gravity due to invalid input signals. The center of gravity estimate is also input into a high pass filter. The high pass filter filters the center of gravity estimate to prevent rapid swings of the estimate, again typically caused by invalid input signals.

In accordance with still another aspect of the invention, the center of gravity estimate is stored in memory when the aircraft passes a certain altitude during the landing procedure. By storing the center of gravity as the aircraft's descends through a desired altitude, the flight control system which depends on the center of gravity estimate to implement flight control laws will not have to perform critical recalculations during the landing phase of flight. Because the center of gravity of the aircraft typically does not change very quickly, the estimate of the center of gravity stored at the desired altitude will provide accurate control law results during the final period of aircraft descent.

Several advantages arise from the method and apparatus for estimating an aircraft's center of gravity disclosed herein. Most importantly, the method of calculating the center of gravity described above uses a first-order equation. Because the equation is linear, the method may be easily implemented in the aircraft flight control system and require a minimum computational time. The estimate of the center of gravity generated by the method disclosed herein also provides a closer approximation to the actual center of gravity in the aircraft than that disclosed by the '896 patent. Although not directly equal to the slightly convex shape of the measured graph of an aircraft stabilizer position versus angle of attack for a given center of gravity, the method and apparatus disclosed herein produces a center of gravity estimate that falls within 1% MAC of the measured graph over a large angle of attack range. Additionally, a large number of factors are used to estimate the center of gravity, including the aircraft's angle of attack, flap setting, stabilizer position, weight, dynamic pressure, reference wing area, and load factor. Because of the number of factors involved in calculating the center of gravity, the method may be easily adapted for use in different aircraft having various engine and wing configurations.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
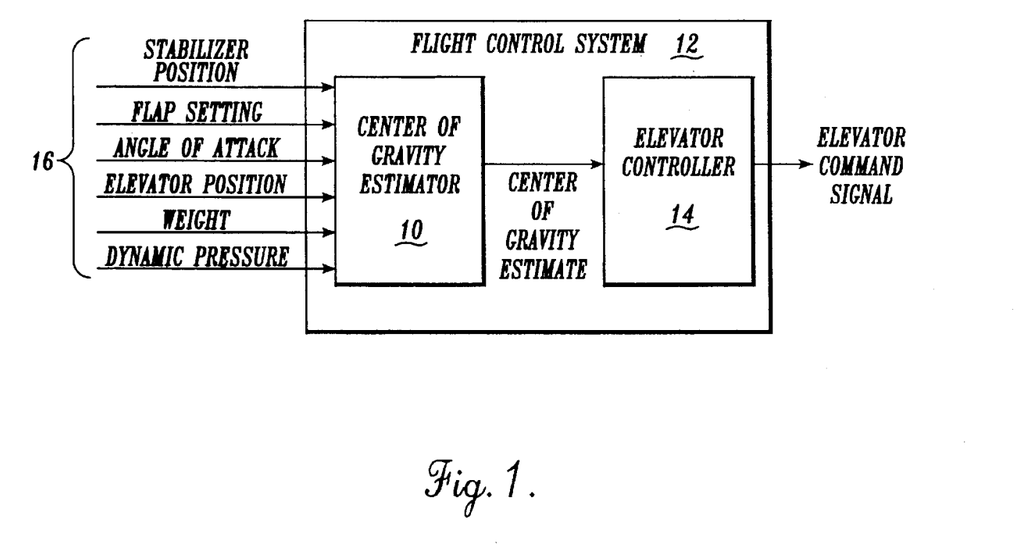
FIG. 1 is a block diagram that depicts a center of gravity estimator that is embodied in an aircraft flight control system for implementing a flight control law during an aircraft maneuver.

FIG. 1 is a block diagram that illustrates a center of gravity estimator (generally denoted by reference numeral 10) that is configured in accordance with the disclosed invention and is embodied in an aircraft flight control system 12 along with an elevator controller 14. A number of signals 16 indicative of control surface settings or other aircraft conditions are input into the center of the gravity estimator. Based on the signals 16, center of gravity estimator 10 provides a real time center of gravity estimate to the elevator controller in order to implement certain control laws during autoland operation. For example, the center of gravity estimate generated by the center of gravity estimator may be used by the elevator controller to provide appropriate stabilizer mistrim during landing. The cooperation of the center of gravity estimator with the elevator controller and further details of the elevator controller are disclosed in U.S. Pat. No. 5,034,896, expressly incorporated herein by reference (hereinafter referred to as the '896 patent).

As discussed above, the '896 patent's method of estimating an aircraft center of gravity produces a nonlinear graph of an aircraft's stabilizer position versus angle of attack, especially over an angle of attack between 3° and 6°. In contrast, the method and apparatus disclosed herein for estimating the aircraft center of gravity produces a linear stabilizer position versus angle of attack graph for a given center of gravity. The linear estimation more closely approximates the actual center of gravity of the aircraft over a broader angle of attack range. As will be discussed in additional detail below, the signal processing method used by center of gravity estimator 10 to estimate an aircraft's center of gravity during flight can be mathematically represented as:

$$CG\_EST = 0.25 + \frac{\frac{K_C}{4}(K_1 + K_2(\alpha_B) + K_3(STAB))}{\frac{nw}{qs}} \qquad (1)$$

Where:

$K_1$, $K_2$, $K_3$, and $K_c$ are constants;

n=Normal load factor;

w=Gross weight of the aircraft;

q=Dynamic pressure on the aircraft;

s=Reference wing area of the aircraft;

$\alpha_B$=Aircraft angle of attack; and

STAB=Aircraft stabilizer position.

Figure 2A:
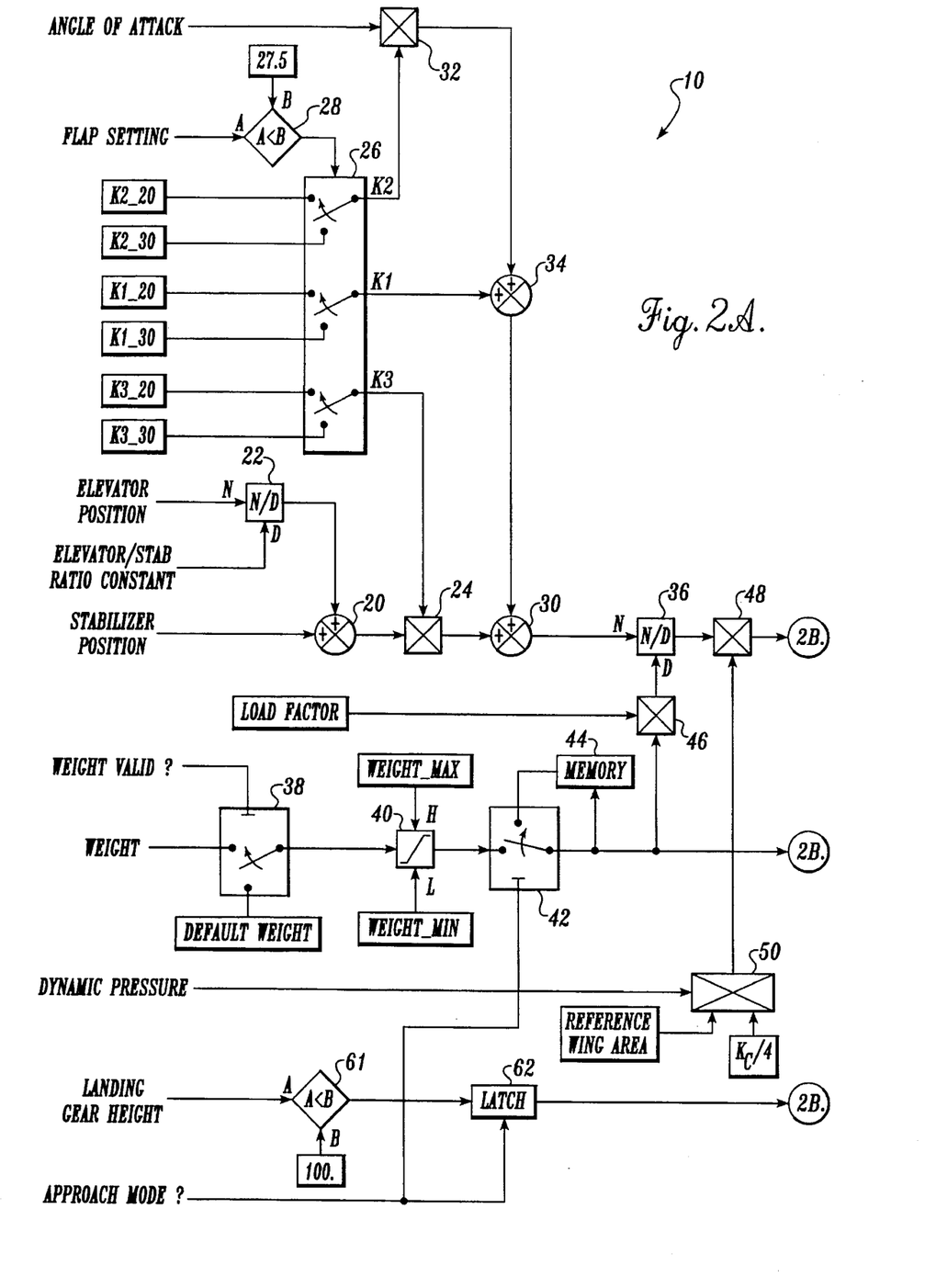
FIGS. 2A and 2B are block diagrams of the center of gravity estimator configured in accordance with the disclosed invention.
Figure 2B:
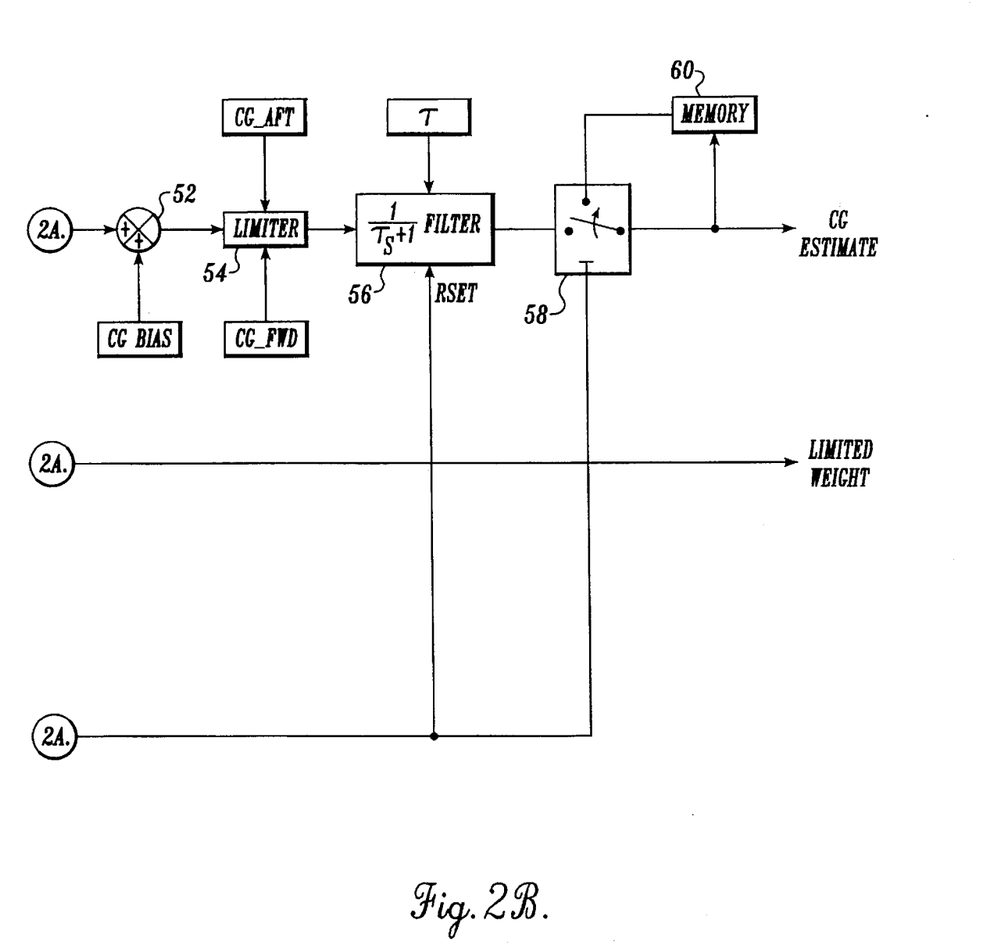

A block diagram of a control law for implementing the center of gravity equation (1) in center of gravity estimator 10 is shown in FIGS. 2A and 2B. Those skilled in the art will recognize that the control law depicted in FIGS. 2A and 2B can be implemented using digital hardware, analog hardware, or a combination of the two. In this regard, modem flight control systems, including autopilots and automatic landing systems, are typically digital processors that can be programmed to effect required navigation and flight control laws. Accordingly, in most instances the disclosed invention will be practiced by programming such a flight control system to execute the depicted control law.

The signals represented as being input on the left side of the control law diagram are typically generated by a flight management computer (not shown). Each signal may be in digital or analog form, although in a preferred embodiment the signal values are digital. The preferred embodiment of the control system disclosed herein was implemented in a Boeing 777 commercial aircraft. The signal ranges described below will therefore be particular to the flight control system of the 777. It will be appreciated, however, that various changes can be made to the constants and variables in the control law described herein to implement center of gravity estimator 10 on other aircraft.

The initial approximation of the center of gravity of the aircraft in which the center of gravity estimator is installed is based on the aircraft's angle of attack, flap setting, elevator position, and stabilizer position. As shown in FIGS. 2A and 2B, a signal indicative of the aircraft stabilizer position is input into an adder 20. Also input into adder 20 is a signal indicative of an effective elevator position. The effective elevator position signal has two components. The first component, a signal indicative of the aircraft's elevator position, is input as the numerator into a divider 22. The second component, a signal representing an elevator/stab ratio constant, is input as the denominator into the divider 22. The elevator/stab ratio constant is a ratio of the effectiveness of the elevator to the effectiveness of the stabilizer. Divider 22 divides the elevator position signal by the elevator/stab ratio constant to scale the elevator position signal and produce a signal indicative of the elevator's effect on the stabilizer position. The elevator/stab ratio constant is based upon the particular airplane configuration and flaps, which for a preferred embodiment of the system corresponding to the Boeing 777 ranges between a value of 1.6 to 2.0. Adder 20 adds the effective elevator position signal to the stabilizer position signal to produce an adjusted stabilizer signal.

The adjusted stabilizer signal produced by adder 20 is input into a multiplier 24, where the signal is multiplied by a signal representing a constant $K_3$. The value of constant $K_3$ is dependent upon the flap setting of the aircraft. In general, signals representing various constants for the center of gravity estimator are connected to a bank of two-position switches 26. A signal indicative of the aircraft's flap setting is input into a comparator 28 which is connected to the bank of switches 26. The flap setting of the aircraft is compared to a signal equivalent to a flap setting of 27.5. If the flap setting of the aircraft is less than 27.5, the bank of switches 26 is switched to conduct one set of signals representing constants $K_1$, $K_2$, and $K_3$. If the flap setting of the aircraft is greater than 27.5, the bank of switches 26 is switched to conduct a second set of signals representing constants $K_1$, $K_2$, and $K_3$. It will be appreciated that the constant 27.5 is recognized in the art as a common division between the two flap settings typically used while landing. During a landing approach, large cargo and transport aircraft will set the flap position to either flaps 20 or flaps 30. If the center of gravity equation is to be implemented for other flap settings, the bank of switches 26 may be suitably expanded to allow a greater number of signals representing the constants $K_1$, $K_2$, and $K_3$ to be switched. The method of arriving at the particular value of each constant will be described below with respect to FIGS. 3 and 4.

After the signal indicative of the adjusted stabilizer position has been multiplied by constant $K_3$, the signal is input into an adder 30. Adder 30 adds the signal to a signal that is representative of the aircraft's angle of the attack. A signal indicative of the aircraft's angle of attack is initially input into a multiplier 32, where it is multiplied by a signal representing a constant $K_2$. As discussed above with respect to the constant $K_3$, the value of the constant $K_2$ is dependent on the flap setting of the aircraft. If the flap setting is 20, one value of the constant will be selected. If the flap setting is 30, a second value of the constant will be selected. After being multiplied by the constant $K_2$, the angle of attack signal is input into an adder 34, where it is added with a signal representing a constant $K_1$. Constant $K_1$ is similarly dependent on the aircraft flap setting. The sum signal produced by adder 34 is therefore dependent upon the angle of attack and the flap setting of the aircraft. The signal produced by adder 34 is then added to the signal indicative of the adjusted stabilizer position by adder 30.

The output from adder 30 is an initial approximation of the aircraft's center of gravity based on the aircraft's angle of attack, flap setting, elevator position, and stabilizer position. The remainder of the control law further refines the initial approximation by taking into account additional aircraft characteristics.

Adder 30 is connected to a divider 36. The initial approximation of the center of gravity produced by adder 30 is input as the numerator to divider 36. A signal proportional to the weight of the aircraft is input as the denominator to divider 36. As shown in FIGS. 2A and 2B, a signal indicative of the weight of the aircraft is initially input into a switch 38. Also connected to switch 38 is a signal indicating whether the weight signal is valid. The state of switch 38 is dependent upon the weight valid signal. If the weight is valid, the switch conducts the weight signal to a limiter 40. If the weight is not valid, the switch is switched to allow a signal representative of a default aircraft weight to be input into limiter 40. The weight valid signal is generated by the flight management computer, and is based on a comparison of redundant weight signals indicative of the weight of the aircraft. Those skilled in the art will appreciate that the flight management compares the various weight signals and determines whether the represented weight is valid based on a number of different criteria that are not relevant to the present invention.

Limiter 40 compares the signal proportional to the weight of the aircraft with both a maximum and a minimum value. Since in the preferred embodiment disclosed herein the center of gravity estimate is used in the automatic landing procedure, the maximum value corresponds to the maximum landing weight of the aircraft. The minimum value corresponds to the empty weight of the aircraft plus a nominal amount of fuel. If the aircraft weight exceeds either the maximum or the minimum, the aircraft weight is set to the maximum or the minimum value respectively. It will be appreciated that the maximum and the minimum values selected for limiter 40 will depend upon the type of aircraft, the configuration of the aircraft, and the expected load.

After passing through limiter 40, the signal indicative of the aircraft weight is input into a two-position switch 42. In a first position, switch 42 conducts the signal indicative of the aircraft weight to a memory 44 and a multiplier 46. When so connected, memory 44 continuously stores the value of the aircraft weight. In a second position, switch 42 disables the connection with the aircraft weight signal and connects memory 44 with multiplier 46. In the second position, the value of the aircraft weight remains constant at the value stored in memory. The position of switch 42 is dependent upon whether the aircraft has entered an approach mode. In normal operation, the weight of the aircraft will be constantly charging as fuel is burned. The changing weight causes the center of gravity estimator to produce a slightly varying estimate of the center of gravity. During landing, it is preferred that the center of gravity estimate not change to avoid subtle recalculations by the flight control system. When the aircraft has entered an approach mode, switch 42 is therefore switched to connect memory 44 with multiplier 46. This freezes the value of the aircraft weight and ensures that the center of gravity estimate remains constant during the landing approach.

At multiplier 46, the signal indicative of the aircraft's weight is multiplied by a signal representing a load factor (n). The load factor is equal to the total lift of the aircraft divided by the weight of the aircraft. In a typical landing procedure, the steady state load factor should be approximately 1.0 g. In the preferred embodiment of the center of gravity estimator, optimal operation occurs when the load factor falls between 0.9 and 1.1. It will be appreciated, however, that for other non-passenger aircraft, the load factor may be adjusted depending upon the configuration and expected handling of the aircraft.

After being multiplied by the load factor, the signal indicative of the weight of the aircraft is input as the denominator into divider 36. Divider 36 divides the initial approximation of the aircraft's center of gravity by the signal proportional to the aircraft weight and inputs the result into a multiplier 48. Multiplier 48 multiplies the signal from divider 36 by a signal that is proportional to the dynamic pressure (q) on the aircraft. A signal indicative of the dynamic pressure on the aircraft is initially generated by an air data inertial reference unit (ADIRU) in the aircraft (not shown) and provided to a multiplier 50. The dynamic pressure is a function of the aircraft velocity, and is equal to:

$$q = \frac{1}{2} \rho v^2$$

where:

$\rho$=air density (approximately 0.002379 slug/ft$^3$); and v=aircraft velocity (et/sec).

Multiplier 50 multiplies the dynamic pressure signal by two constants. The first constant (s) corresponds to a reference wing area of the aircraft. In a preferred embodiment of the invention, the Boeing 777 aircraft has a reference wing area of 4,605 ft$^2$. The second constant ($K_{C/4}$) is a ratio where the numerator is the distance from the wing quarter-chord to the horizontal quarter-chord and the denominator is the mean aerodynamic chord of the wing. In the preferred embodiment of the invention corresponding to the Boeing 777, the constant $K_{C/4}$ is approximately 4.0. After the signal indicative of the dynamic pressure on the wing is multiplied by both the reference wing area and $K_{C/4}$, the signal is input into a multiplier 48. Multiplier 48 produces an estimate of the center of gravity that is proportional to the angle of attack of the aircraft, the flap setting of the aircraft, the elevator position of the aircraft, the stabilizer position of the aircraft, the weight of the aircraft, and the dynamic pressure on the aircraft.

The center of gravity estimate produced by multiplier 48 is input into an adder 52. Adder 52 adds to the initial estimate a bias that is particular to the aircraft for which the center of gravity estimator is designed. In the preferred embodiment of the invention corresponding to the Boeing 777, the bias is equal to 0.25. It will be appreciated that the use of a bias to which an estimate is added or subtracted is a technique commonly used in aircraft design. The bias is selected so that the estimated center of gravity closely matches the measured center of gravity over the range of interest. After adding the bias to the center of gravity estimate, the signal is input into a limiter 54. The limiter 54 compares the center of gravity estimate with limits establishing the maximum forward and maximum aft center of gravity determined by simulation. The center of gravity estimate produced by the center of gravity estimator must fall within the range defined by the limiter for the estimation to be accurate. If the estimate of the center of gravity exceeds the maximum or minimum values, limiter 54 sets the center of gravity signal equal to the respective limit that is exceeded.

After being limited, the estimated center of gravity signal is input into a filter 56. Filter 56 is a low pass filter which filters the center of gravity signal to remove noise from the center of gravity estimate, and to prevent any spurious input signal levels from causing a momentary error in the center of gravity calculation. In the preferred embodiment of the invention, the low pass filter has a transfer function of $1/(\tau S+1)$, where the time constant x is selected to be very long. In an actual embodiment of the invention, z is equal to 10 seconds. After being filtered, the signal indicative of the estimated center of gravity is input into a two-position switch 58. In a first position, switch 58 allows the center of gravity signal to be conducted directly to the aircraft flight control system, where it may be used in the execution of one or more control laws that establish the aircraft flight path. In the first position, the center of gravity signal is also input to a memory 60, which continuously stores the value of the signal. In a second position, switch 58 disconnects the output of filter 56 and connects memory 60 with the aircraft flight control system. In this position, the center of gravity estimate provided to the aircraft flight control system retains the value that was stored in memory 60 immediately preceding the switching of switch 58 to the second position.

The position of switch 58 is dependent upon whether the aircraft has entered an approach mode and has descended below a minimum altitude. The position of switch 58 is dictated by a control signal received from a latch 62. Latch 62 has two inputs, the first of which is dependent on the aircraft altitude. A signal indicative of the altitude of the aircraft is entered into a comparator 61. Comparator 61 compares the altitude signal with a constant, which in a preferred embodiment of the estimator is set to 100 feet. If the aircraft is less than 100 feet, a true signal is provided by comparator 61 to latch 62. A second input to latch 62 is a true or false signal indicating whether the aircraft has entered an approach mode. If both the altitude comparison and the approach mode are true, latch 62 generates a control signal that switches switch 58 so that the center of gravity estimate provided to the flight control system is the center of gravity estimate stored in memory 60. In this manner, as the aircraft comes in for a landing, the center of gravity estimate will remain constant so that the appropriate control laws are not constantly being recalculated. Regardless of the storage function of memory 60, it will be appreciated that in the final stages of landing, there should be little, if any, changes in the estimated center of gravity.

The center of gravity estimator may implement the control law shown in FIGS. 2A and 2B at a desired speed to provide a real time estimate of an aircraft center of gravity. In a preferred embodiment of the invention, the center of gravity is recalculated every 50 milliseconds. It will be appreciated that the recalculation period between center of gravity estimates may be increased or slowed to meet the performance of the aircraft. Moreover, the center of gravity estimate may be continuously recalculated if required by an aircraft's flight control system.

Figure 3:
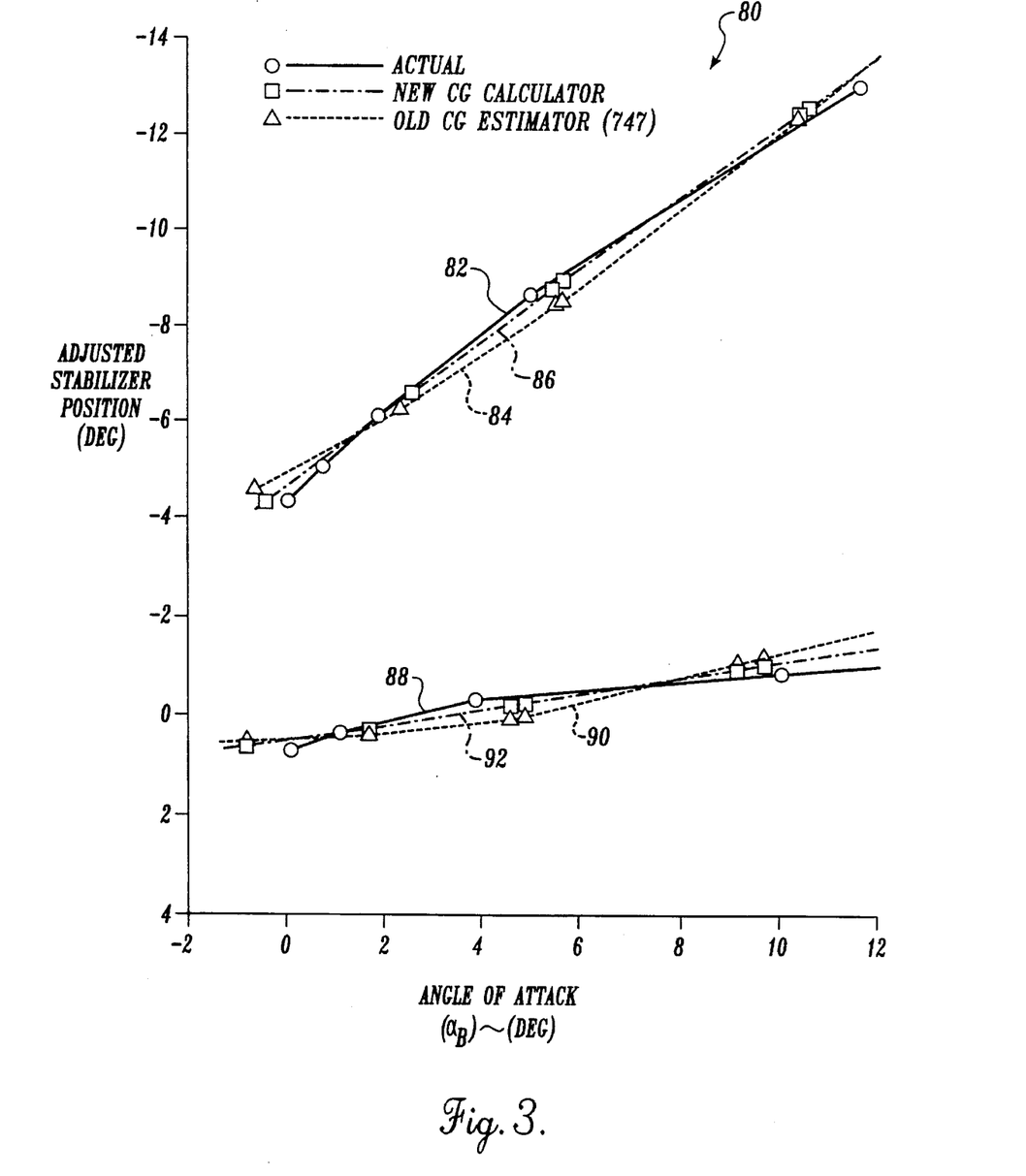
FIG. 3 is a graph of the relationship between the stabilizer position and the aircraft angle of attack for flaps 20, and a center of gravity in a maximum forward and aft positions, with separate relationships being depicted for a measured set of values, a set of values generated using a method described in U.S. Pat. No. 5,034,896, and a set of values using the method disclosed herein.

The center of gravity estimation equation (1) produces results that are more accurate than the graphical method implemented in the '396 patent. FIG. 3 is a graph of an aircraft's stabilizer position plotted against an aircraft's angle of attack when the flaps are set at 20, the glide slope is −3°, and the center of gravity of the aircraft is located in two different positions. An upper group of lines, represented by lines 82, 84, and 86, describe the stabilizer position versus angle of attack when the center of gravity in an aircraft is at its maximum forward position. A lower group of lines, represented by lines 88, 90, and 92, describe the stabilizer position versus angle of attack when the aircraft's center of gravity is at its maximum aft position. In a preferred embodiment of the invention in which the center of gravity estimator is implemented in the Boeing 777, the maximum center of gravity forward position is 0.14% MAC, and the maximum center of gravity aft position is 0.44% MAC.

Examining the upper group of lines representing when the center of gravity is in its most forward position, the improved performance of the center of gravity estimation equation disclosed herein is clearly shown. Line 82 represents the actual aircraft stabilizer position versus angle of attack plot as determined from simulated test landings. Line 82 is slightly convex over the range of interest corresponding to an angle of attack from 0° to 12°. Line 84 represents an aircraft's stabilizer position versus angle of attack as calculated by the graphical method of estimating an aircraft's center of gravity disclosed in the '896 patent. Line 84 is slightly concave, thus generating an error with respect to the measured relationship. In particular, when the angle of attack falls between 3° and 6°, the center of gravity estimate produced by the '896 patent is in error by as much as 4% MAC. Line 86 is the center of gravity estimate produced by the center of gravity equation (1) disclosed herein. Line 86 is linear, and falls between measured line 82 and line 84 generated by the '896 patent. The center of gravity equation therefore more closely approximates the measured stabilizer position versus angle of attack relationship represented by line 82. In the preferred embodiment of the invention, line 86 falls within 1% MAC over an angle of attack range from 0° and 12°.

To ensure an accurate center of gravity estimate, constants $K_1$, $K_2$, $K_3$, and $K_{-c/4}$ are selected so that the graph of the center of gravity estimate closely fits the measured value of the aircraft's stabilizer position versus angle of attack for a particular center of gravity. It will be appreciated that several mathematical techniques exist for fitting a straight line to a given curve. In a preferred embodiment of the invention, an iterative process was used to fit the estimated stabilizer position versus angle of attack graph to the measured (by simulation) stabilizer position versus angle of attack graph. Using the iterative process, the constants have been determined to have the following values:

| Flaps | $K_1$ | $K_2$ | $K_3$ | $K_{c/4}$ |
|---|---|---|---|---|
| 20 | 0.0195951 | 0.0073497 | 0.0132457 | 4.0 |
| 30 | 0.0346396 | 0.0066254 | 0.0137011 | 4.0 |

Similarly, the lower group of lines represents the stabilizer position versus the angle of attack position when the center of gravity is at its maximum aft position. Line 88 represents the actual stabilizer position versus angle of attack plot for an aircraft as determined from simulated landings. Line 90 represents the center of gravity estimate by the graphical method disclosed in the '896 patent. Again, the actual stabilizer position versus angle of attack plot is slightly concave, and the stabilizer position versus angle of attack plot produced by the '896 patent center of gravity estimator is slightly convex. Line 92 is a plot of the stabilizer position versus angle of attack as calculated using center of gravity equation (1) disclosed herein. Line 92 provides a more accurate estimate of the center of gravity of an aircraft, since it more closely approximates line 88.

It will be appreciated that although only two groupings of lines are shown in graph 80, a plurality of lines may be plotted, each line representing a stabilizer position versus an angle of attack for a particular center of gravity. As discussed above, in a preferred embodiment of the invention, the center of gravity ranges between 0.14% MAC and 0.44% MAC. The selection of a stabilizer angle and an angle of attack define a discrete point on one of the center of gravity lines, identifying the desired center of gravity estimate which may be used by the flight management computer to execute appropriate maneuvers.

Figure 4:
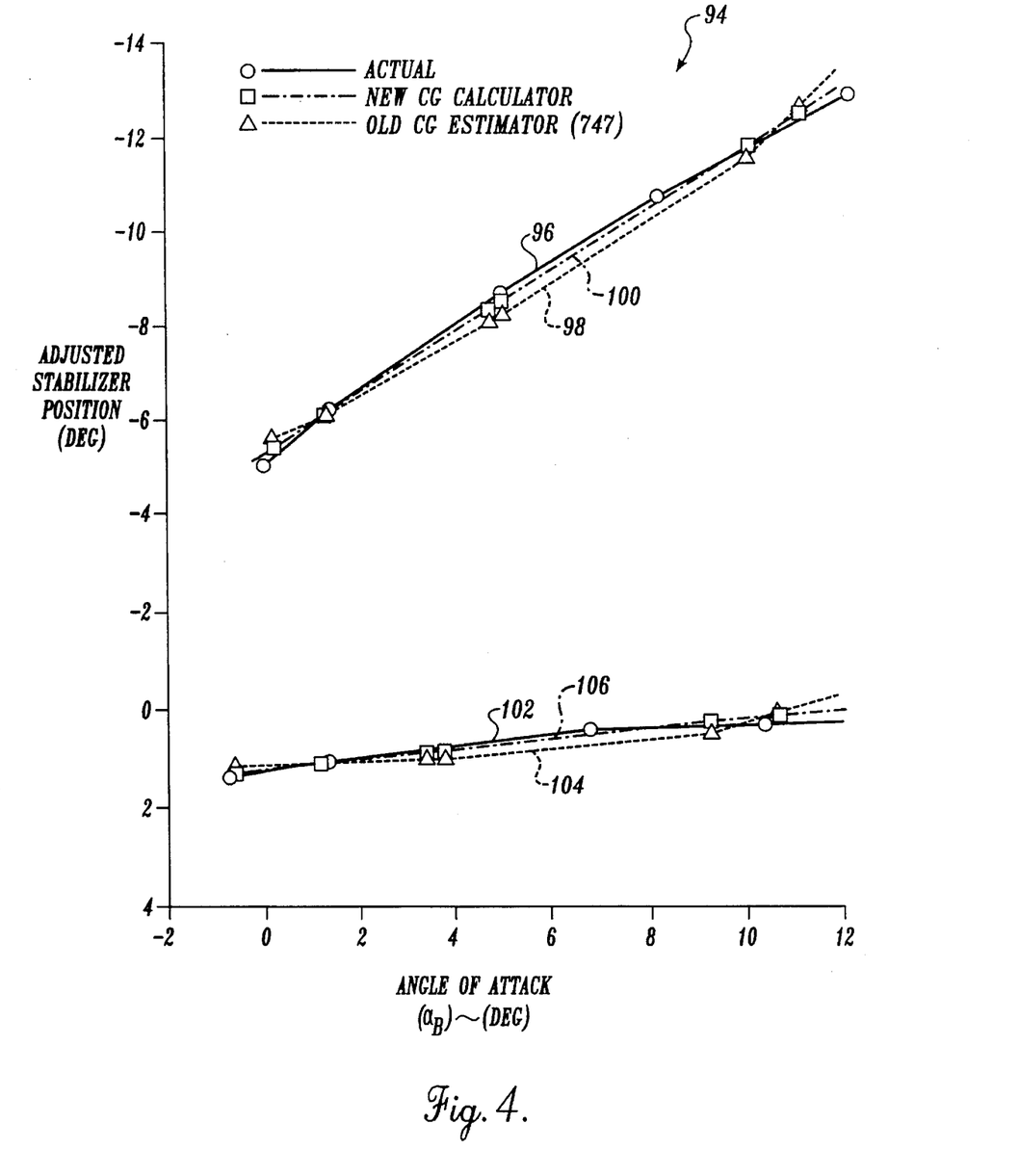
FIG. 4 is a graph of the relationship between the stabilizer position and the aircraft angle of attack for flaps 30, and a center of gravity in a maximum forward and aft positions, with separate relationships being depicted for a measured set of values, a set of values generated using a method described in U.S. Pat. No. 5,034,896, and a set of values using the method disclosed herein.

FIG. 4 presents a graph 94 showing an aircraft stabilizer position versus aircraft angle of attack when the flaps are set at 30 and the glide slope if −3°. As before, two groups of lines are present. The upper group including line 96, line 98, and line 100 represents the stabilizer position versus angle of attack when the center of gravity is at its maximum forward position. A lower group of lines including lines 102, 104, and 106 represents the aircraft stabilizer position versus angle of attack when the center of gravity is at its farthest aft position. Examining each group of lines reveals that the plot of the measured stabilizer position versus angle of attack is slightly convex as represented by lines 96 and 102. The old center of gravity estimate produced by the graphical method of the '896 patent is slightly concave as represented by lines 98 and 104. However, the center of gravity estimate produced by the equation (1) described above produces a linear estimate as represented by lines 100 and 106. The linear estimate is a more accurate representation of the actual stabilizer position versus the angle of attack over the range of interest.

It will be appreciated that use of the linear center of gravity equation (1) offers several advantages over the graphical technique disclosed in the prior art. The linear equation produces a center of gravity estimate accurate to within approximately 1% MAC over an angle of attack from 0° to 12°. In contrast, the graphical method disclosed in the '896 patent produces a center of gravity estimate accurate to within approximately 4% MAC over a narrower range of the aircraft angle of attack. The center of gravity estimator disclosed herein thus offers a more accurate estimate of the aircraft center of gravity during flight.

It will further be appreciated that implementing the center of gravity estimation equation (1) is an easier task than implementing the graphical method described in the '896 patent. Those skilled in the art will recognize that equation (1) may be easily implemented using a digital computer to solve for CG_EST. Equation (1) therefore simplifies incorporation of the center of gravity estimator into the flight control system and also shortens the processing time necessary to produce a center of gravity estimate.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of determining the location of an aircraft's center of gravity in an aircraft flight control system that employs the aircraft's center of gravity location for executing one or more control laws that establish the flight path of the aircraft, said method comprising the steps of:

(a) obtaining signals from said aircraft flight control system that are representative of the aircraft angle of attack, flap setting, stabilizer position, effective elevator position, effective weight, and dynamic pressure;

(b) adding the aircraft effective elevator position signal to the aircraft stabilizer position signal to determine an adjusted stabilizer position signal;

(c) multiplying the adjusted stabilizer position signal by a first constant that is based on the aircraft flap setting signal to determine a scaled stabilizer position signal;

(d) adding to the scaled stabilizer position signal a first additive factor that is based on the aircraft angle of attack signal and the aircraft flap setting signal to determine a first approximation signal;

(e) dividing the first approximation signal by the aircraft effective weight signal to determine a second approximation signal;

(f) multiplying the second approximation signal by the aircraft dynamic pressure signal to determine an estimate of the location of the aircraft center of gravity; and (g) supplying as a flight control signal the estimate of the location of the aircraft center of gravity to said aircraft flight control system, the flight control signal being used in the execution of one or more control laws controlling a flight control surface of said aircraft.

2. The method of claim 1, wherein the aircraft effective elevator position signal is determined by the steps of:

(a) obtaining from the aircraft flight control system an elevator position signal that is proportional to the elevator position of the aircraft and an elevator/stab ratio constant signal describing the effect the elevator position has on the stabilizer position of the aircraft; and (b) dividing the elevator position signal by the elevator/stab ratio constant signal to generate the effective elevator position signal.

3. The method of claim 1, wherein the aircraft flap setting signal is indicative of whether the aircraft flap setting is a first or a second predetermined flap setting, and wherein said method further comprises the steps of:

(a) determining from the aircraft flap setting signal whether the aircraft flap setting is the first or the second predetermined flap setting;

(b) establishing a first value for the first constant when the flap setting is the first predetermined flap setting; and (c) establishing a second value for the first constant when the flap setting is the second predetermined flap setting.

4. The method of claim 1, wherein the first additive factor is determined by the steps of:

(a) multiplying the aircraft's angle of attack signal by a second constant that is based on the aircraft's flap setting signal; and (b) adding to the signal produced by step (a) a third constant that is based on the aircraft's flap setting signal to generate the first additive factor.

5. The method of claim 4, wherein the aircraft flap setting signal is indicative of whether the aircraft flap setting is a first or a second predetermined flap setting, and wherein said method further comprises the steps of:

(a) determining from the aircraft flap setting signal whether the aircraft flap setting is the first or the second predetermined flap setting;

(b) establishing a first set of values for the second and third constants when the flap setting is the first predetermined flap setting; and (c) establishing a second set of values for the second and third constants when the flap setting is the second predetermined flap setting.

6. The method of claim 1, wherein the aircraft effective weight signal is determined by the steps of:

(a) obtaining from the aircraft flight control system a weight signal that is proportional to the weight of the aircraft; and (b) multiplying the aircraft weight signal by a load factor to generate the effective weight signal.

7. The method of claim 6, wherein following the step of obtaining from the aircraft flight control system a weight signal the method further comprises the step of comparing the aircraft weight signal with a minimum and a maximum limit and setting the value of the aircraft weight signal equal to the minimum limit if the aircraft weight signal is less than the minimum limit and setting the value of the aircraft weight signal equal to the maximum limit if the aircraft weight signal is greater than the maximum limit.

8. The method of claim 1, wherein the step of multiplying the second approximation signal by the aircraft dynamic pressure signal further comprises multiplying the second approximation signal by a constant equal to a wing area of the aircraft.

9. The method of claim 8, wherein the step of multiplying the second approximation signal by the aircraft dynamic pressure signal further comprises multiplying the second approximation signal by a constant proportional to the ratio of a distance from the wing quarter-chord to the horizontal quarter-chord over the mean aerodynamic chord of the wing.

10. The method of claim 1, further comprising the step of adding a bias value to the estimate of the location of the aircraft center of gravity.

11. The method of claim 1, further comprising the step of comparing the estimate of the location of the aircraft center of gravity with a maximum forward limit and a maximum aft limit and setting the estimate of the location of the aircraft center of gravity equal to the maximum forward limit if the estimate of the location of the aircraft center of gravity exceeds the maximum forward limit, and setting the estimate of the location of the aircraft center of gravity equal to the maximum aft limit if the estimate of the location of the aircraft center of gravity exceeds the maximum aft limit.

12. The method of claim 1, further comprising the step of filtering the signal indicative of the estimate of the location of the aircraft center of gravity to eliminate abrupt changes in the value of the estimate of the location of the aircraft center of gravity.

13. An apparatus for generating a signal representative of a center of gravity of an aircraft during flight based on signals representative of the aircraft angle of attack, flap setting, stabilizer position, effective elevator position, effective weight, and dynamic pressure, the signal representative of the center of gravity being provided to an aircraft flight control system to execute one or more control laws that establish a flight path of the aircraft, the apparatus comprising:

(a) a first adder to sum said effective elevator position signal with said stabilizer position signal to generate an adjusted stabilizer position signal;

(b) a first multiplier coupled to the first adder to multiply the adjusted stabilizer position signal by a first constant signal proportional to said flap setting signal to generate a scaled stabilizer position signal;

(c) a second adder coupled to the first multiplier to sum the scaled stabilizer position signal with a first additive factor signal proportional to said angle of attack signal and said flap setting signal to generate a first approximation signal;

(d) a divider coupled to the second adder to divide the first approximation signal by said effective weight signal to generate a second approximation signal;

(e) a second multiplier coupled to the divider to multiply the second approximation signal by said dynamic pressure signal to generate a signal representative of the center of gravity of said aircraft; and (f) flight control means coupled to the second multiplier and utilizing the signal representative of the center of gravity of said aircraft during the execution of at least one control law that controls the flight of said aircraft.

14. The apparatus of claim 13, wherein said effective elevator position signal is a ratio of an elevator position signal proportional to an elevator position of said aircraft to an elevator/stab ratio constant signal representative of the effect the elevator position has on a stabilizer position of said aircraft.

15. The apparatus of claim 13, wherein the first constant signal assumes a first value when said flap setting signal indicates a first predetermined flap setting, and a second value when said flap setting signal indicates a second predetermined flap setting.

16. The apparatus of claim 13, wherein the first additive factor signal is the sum of a third constant signal that is based on said flap setting signal and the product of a second constant signal proportional to said flap setting signal and said angle of attack signal.

17. The apparatus of claim 16, wherein said flap setting signal may assume a first predetermined flap setting or a second predetermined flap setting.

18. The apparatus of claim 13, wherein said effective weight signal is the product of a weight signal that is proportional to a weight of said aircraft and a load factor signal indicative of a desired load factor.

19. The apparatus of claim 18, further comprising a comparator for comparing the weight signal with a minimum signal level and a maximum signal level, the comparator setting the weight signal equal to the minimum signal level if the weight signal is less than the minimum signal level and setting the weight signal equal to the maximum signal level if the weight signal is greater than the maximum signal level.

20. The apparatus of claim 13, wherein the second multiplier further multiplies the second approximation signal by a constant signal proportional to a wing area of said aircraft.

21. The apparatus of claim 20, wherein the second multiplier further multiplies the second approximation signal by a constant signal proportional to the ratio of a distance from the wing quarter-chord to the horizontal quarter-chord over the mean aerodynamic chord of the wing.

22. The apparatus of claim 13, further comprising a third adder coupled between the second multiplier and the flight control means, the third adder adding a bias signal to the signal representative of the center of gravity of said aircraft.

23. The apparatus of claim 13, further comprising a comparator coupled between the second multiplier and the flight control means, the comparator comparing the signal representative of the center of gravity of said aircraft with a maximum forward limit signal and a maximum aft limit signal, the comparator setting the signal representative of the center of gravity of said aircraft to the maximum forward limit signal if the signal representative of the center of gravity of said aircraft exceeds the maximum forward limit signal, and setting the signal representative of the center of gravity of said aircraft to the maximum aft limit signal if the signal representative of the center of gravity of said aircraft exceeds the maximum aft limit signal.

24. The apparatus of claim 13, further comprising a filter coupled between the second multiplier and the flight control means, the filter filtering the signal representative of the center of gravity of said aircraft to minimize abrupt changes in the signal value.

* * * * *